United States Patent [19]

Hayashi

[11] Patent Number: 4,777,394
[45] Date of Patent: Oct. 11, 1988

[54] MINIATURE GENERATOR

[75] Inventor: Katsuhiko Hayashi, Nagano, Japan

[73] Assignee: Kabushiki Kaisha Sankyo Seiki Seisakusho, Nagano, Japan

[21] Appl. No.: 70,952

[22] Filed: Jul. 8, 1987

[30] Foreign Application Priority Data

Jul. 14, 1986 [JP] Japan .................................. 61-107836

[51] Int. Cl.$^4$ ............................................. H02K 7/06
[52] U.S. Cl. ........................................ 310/83; 310/42;
310/90; 310/156; 310/216; 310/68 E; 310/76;
310/77
[58] Field of Search .............. 310/40 MM, 42, 46, 48,
310/51, 66, 67 R, 69, 72, 73, 75 R, 75 A, 75 B,
83, 89, 90, 91, 92, 100, 95-97, 156, 68 E,
216-218, 254, 259, 76, 77

[56] References Cited

U.S. PATENT DOCUMENTS

| | | | |
|---|---|---|---|
| 3,320,446 | 5/1967 | Anderson, Jr. ...................... | 310/42 |
| 3,390,289 | 6/1968 | Dijken et al. .......................... | 310/42 |
| 3,443,137 | 5/1969 | McElroy ............................. | 310/216 |
| 3,496,632 | 2/1970 | Deming et al. .................... | 310/42 X |
| 3,532,914 | 10/1970 | Chang et al. ...................... | 310/68 E |
| 3,935,489 | 1/1976 | Church et al. ......................... | 310/90 |
| 4,224,544 | 9/1980 | McKinnon et al. .................. | 310/90 |
| 4,482,832 | 11/1984 | Minton ................................ | 310/216 |
| 4,675,566 | 6/1987 | Nystuen et al. .................. | 310/42 X |

FOREIGN PATENT DOCUMENTS

57-27407  2/1982  Japan .

Primary Examiner—Mark O. Budd
Attorney, Agent, or Firm—Flynn, Thiel, Boutell & Tanis

[57] ABSTRACT

A miniature generator includes a cup-shaped supporting shell for fixing a yoke assembly, which supporting shell includes a bearing for a rotary shaft of a permanent magnet rotor. The rotary shaft of the rotor is provided with a worm which drives a worm gear engaging with it.

12 Claims, 5 Drawing Sheets

MINIATURE GENERATOR

FIELD OF THE INVENTION

This invention relates to a relatively simple miniature generator which may be used as a power source or the like for lighting or flickering a miniature bulb of a toy or for driving an electronic music box.

BACKGROUND OF THE INVENTION

As a relatively simple miniature generator heretofore used as a power source of a toy, etc., a cordless audio reproducing (Japanese Laying-open Publication No. 52-27407 of a patent application) is known.

In the prior art cordless audio reproducing apparatus, a worm shaft is coupled to a rotary shaft of a generator. Bearing members directly supporting opposite ends of the rotary shaft are formed in a unitary body with a case by casting. This means that the bearing members are made from the same material as that of the case. Therefore, the bearing members are worn out in a short time and cause a vibration.

Further, it is difficult to establish proper alignment between the center of the rotary shaft and the center of a yoke assembly in the building process of the apparatus. Additionally, the prior art apparatus is subject to large changes in the generated voltage with revolution speed of the rotary shaft.

OBJECT OF THE INVENTION

It is therefore an object of the invention to establish a reliable high revolution of a rotary shaft in a miniature generator using a worm on the rotary shaft to obtain a large speed up ratio and a high revolution.

A further object of the invention is to facilitate precise alignment between the center of the rotary shaft and the center of the yoke assembly in the miniature generator.

A still further object of the invention is to improve the stability of the rotation speed of a permanent magnet rotor to substantially uniform the generated voltage.

SUMMARY OF THE INVENTION

According to the present invention, there is provided a miniature generator comprising:

a rotary shaft having a worm and rotated by a driving source at a speed increased by said worm;

a permanent magnet rotor fixed on said rotary shaft;

a yoke assembly encircling said permanent magnet rotor;

a coil wound on said yoke assembly;

a bearing shell including at least one of bearings supporting opposite ends of said rotary shaft, said at least one of bearings supporting one of said ends of said rotary shaft on which an axial urging force caused by rotation of said worm is applied; and a case fixing and supporting said bearing shell.

DETAILED DESCRIPTION

The invention is described below, referring to a miniature generator illustrated in FIGS. 1 through 4 as a first embodiment of the invention.

Referring to FIGS. 1 through 4, a worm 12 is formed along the outer circumference surface of a rotary shaft of a permanent magnet rotor 11. One end 13 of the rotary shaft is rotatably supported by a bearing 19f of a bearing shell 19 whereas the other end 14 of the rotary shaft is rotatably supported by a bearing portion 22a of a bearing pillar 22 upstanding from a case 10. Two brake shoes 20 are mounted on the rotary shaft in a confronting relationship with the magnet rotor 11.

The magnet rotor 11 is encircled by semicircular portions 15a and 16a of two yokes 15 and 16. One of the yokes enumerated by 15 includes the semicircular portion 15a and an L-shaped core portion 15b extending from the outer circumference of the semicircular portion 15a. The other yoke 16 includes the semicircular portion 16a and a straight core portion 16b extending therefrom. Each yoke 15 (16) is a lamination of multiple magnetic plates. The core portion 15b of the yoke 15 passes through a through hole 18a of a with a bobbin 18 threaded with an output coil 17, and its distal end beyond the through hole 18a is connected to a distal end of the core portion 16b of the yoke 16.

Both yokes 15 and 16 are fixed at a predetermined position by the bearing shell 19. The bearing shell 19 is made in the form of a cup having a bottom. Two opposed outer walls 19a and 19b are provided along the outer circumferential margin of the open end of the bearing shell 19. The outer walls 19a and 19b are separated by cutouts 19c and 19d. The bearing shell 19 has an inner circumferential wall 19e having a diameter smaller than the diameter of the outer circumferential walls 19a and 19b. The bearing 19f vertically extends from the bottom into the interior space of the cup. The bearing shell 19 having the above-described arrangement may be made in a unitary body from hardwearing plastic or other non-magnetic hardwearing material. The outer walls 19a and 19b of the bearing shell 19 have an inner circumferential surface fitting the outer circumferential surfaces of the semicircular portions 15a and 16a of the yokes 15 and 16. The junction between the semicircular portion 15a and the core portion 15b of the yoke 15 is accepted in the cutout 19c of the bearing shell 19, and the semicircular portion 15a extends along the inner circumferential surfaces of the outer walls 19a and 19b at opposite sides of the cutout 19c. Similarly, the junction between the semicircular portion 16a and core portion 16b of the other yoke 16 is accepted in the cutout 19d of the bearing shell 19, and the semicircular portion 16a extends along the inner circumferential surfaces of the outer walls 19a and 19b at opposite sides of the cutout 19d. In this fashion, the yokes 15 and 16 are fixed to the bearing shell 19. As a result, the semicircular portions 15a and 16a of the yokes 15 and 16 form a cylindrical surface having substantially the same diameter as that of the inner circumferential wall 19e of the bearing shell 19. Further, opposed end surfaces of the semicircular portions 15a and 16a are spaced by predetermined distances a and b.

Figure 1:
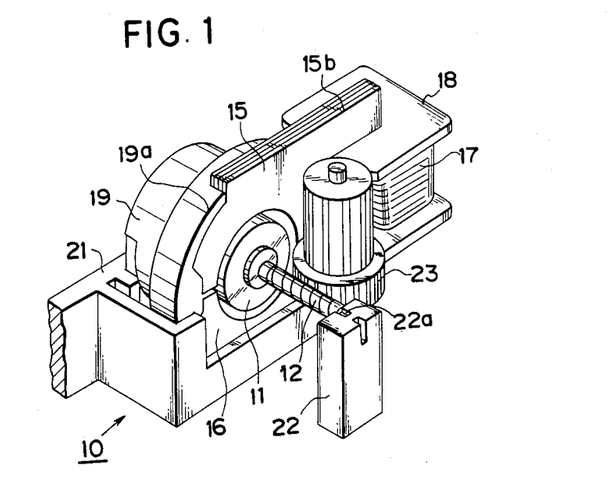
FIG. 1 is a perspective view of a miniature generator embodying the invention.
Figure 2:
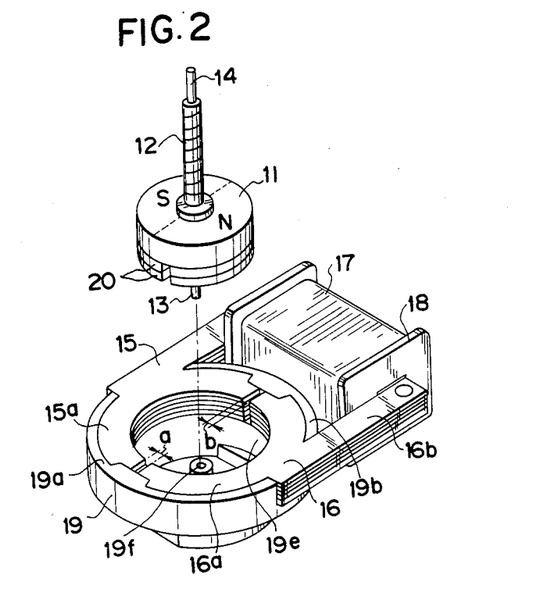
FIG. 2 is a fragmentary exploded perspective view of the miniature generator of FIG. 1 which particularly shows the relationship between a rotor and a stator.

The yokes 15-16, output coil 17, bearing shell 19, etc. form an assembly corresponding to a stator. The stator assembly, as shown in FIG. 1, is accepted in a positioning cavity 21 integrally formed with the case 10 and fixed at a predetermined position in a transversal orientation. One end 13 of the rotary shaft of the magnet rotor 11 engages the bearing 19f of the bearing shell 19 whereas the other end 14 of the rotor shaft engages the groove-shaped bearing portion 22a provided at an upper end portion of the bearing pillar 22 which integrally upstands from the case. In this configuration, the rotor 11 can rotate in a vertical plane. The rotor 11 is encircled by the semicircular portion 15a and 16a of the yokes 15 and 16, interposing a predetermined distance, and the brake shoes 20 are encircled by the inner circumferential wall 19e of the bearing shell 19, interposing a predetermined distance.

Figure 3:
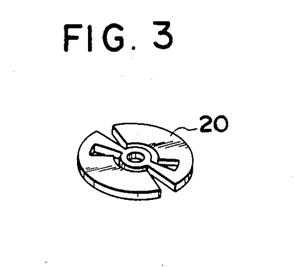
FIG. 3 is a perspective view of a brake shoe used in the generator of FIG. 1.
Figure 4:
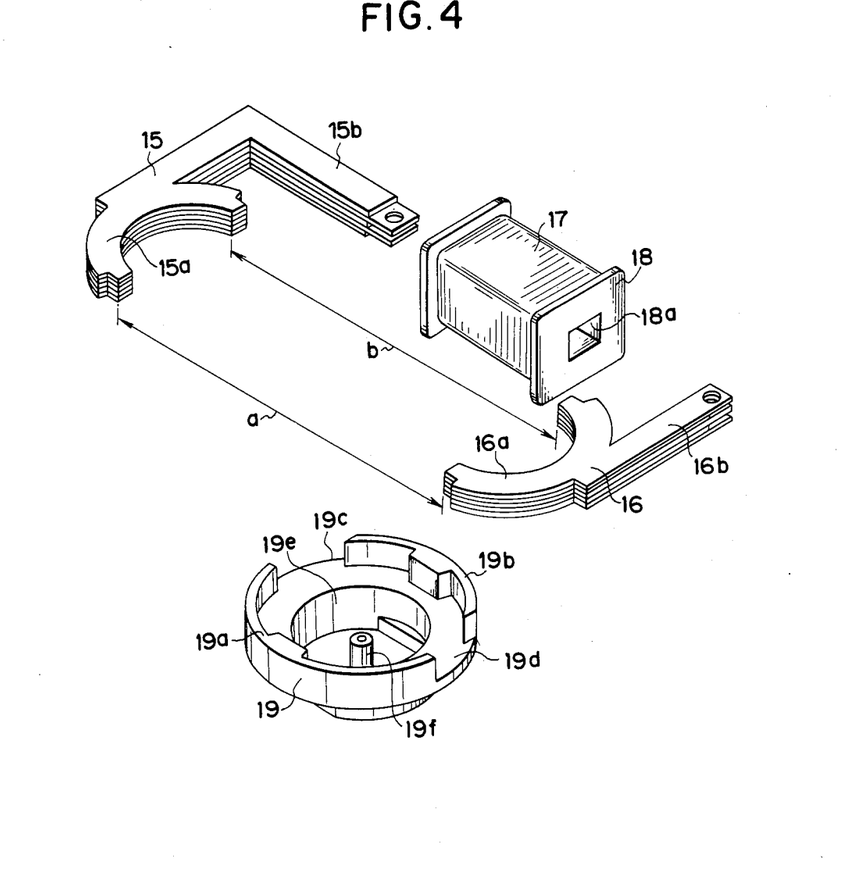
FIG. 4 is a fragmentary exploded perspective view of the stator and related members used in the miniature generator of FIG. 1.

Each brake shoe 20 is a rubber or other resilient plate in the form of FIG. 3. When the brake shoes 20 are rotated together with the magnet rotor 11, they expand radially outwardly due to a centrifugal force and frictionally contact the inner circumferential wall 19e of the bearing shell 19 to control the rotation speed within a limited range. In the illustration, two brake shoes in confrontating alignment are used.

The worm 12 formed on the rotary shaft of the rotor 11 engages a gear 23 so that rotation of the gear 23 is speeded up by the worm 12 to rotate the rotor 11 at an increased speed.

The rotating direction of the gear 23 is selected so that the rotation transmitted from the gear 23 to the worm 12 produces a thrusting force which urges the shaft 12 toward the bearing 19f. In this respect, the bearing 19f must be made from a hardwearing plastic or other hardwearing material which bears a high revolution and a high load. Therefore, the bearing shell 19 including the bearing 19f is originally made as a separate body independent from the case 10, and is fixed to the case 10 later.

The shaft end 13 supports the magnet rotor 11. If any looseness (excessive gap) is produced between the shaft end 13 and the bearing 19f due to friction or any other reason, the shaft end 13 vibrates in the bearing 19f and prevents a smooth rotation. In order to eliminate this problem, the bearing 19f which supports the shaft end 13 subject to a larger load than the other shaft end 14 and liable to cause vibration must be made from hardwearing material as a separate member independent from the case 10. However, since the other shaft end 14 is subject to a smaller load than the shaft end 13, the bearing portion 22a therefor may be formed as a unitary body with the case 10.

The gear 23 may be driven by any driving means such as a spiral spring driving device in case of a toy. Alternatively, it may be manually directly rotated.

When the gear 23 is driven by any driving means (not shown), the rotation is speeded up by the worm 12 and drives the rotor 11. Due to this, the magnetic flux between the yokes 15 and 16 changes, and an electromotive force is generated at the output coil 17. The rotation speed of the rotor 11 is maintained at a substantially uniform value by a frictional force between the inner circumferential wall 19e of the bearing shell 19 and the brake shoes 20 so as to provide a constant electromotive force at the output coil 17.

In the above-described embodiment, the rotary shaft of the magnet rotor 11 and the yokes 15 and 16 are totally held at proper positions by the single cup-shaped bearing shell 19. Therefore, only if the bearing shell 19 is accurately manufactured, it is possible to precisely and readily establish proper alignment between the rotary shaft center of the rotor 11 and the center of the yokes 15 and 16. As a result, the invention alleviates noises during operation of the system and ensures a reliable starting property. Further, the invention arrangement can decrease the gap variation between the yokes 15 and 16 and the rotor 11, and can improve the accuracy of the gaps a and b between the opposed end surfaces of the semicircular portions 15a and 16a of the yokes 15 and 16.

The invention is further described below, referring to a second embodiment illustrated in FIGS. 5 through 7

Figure 5:
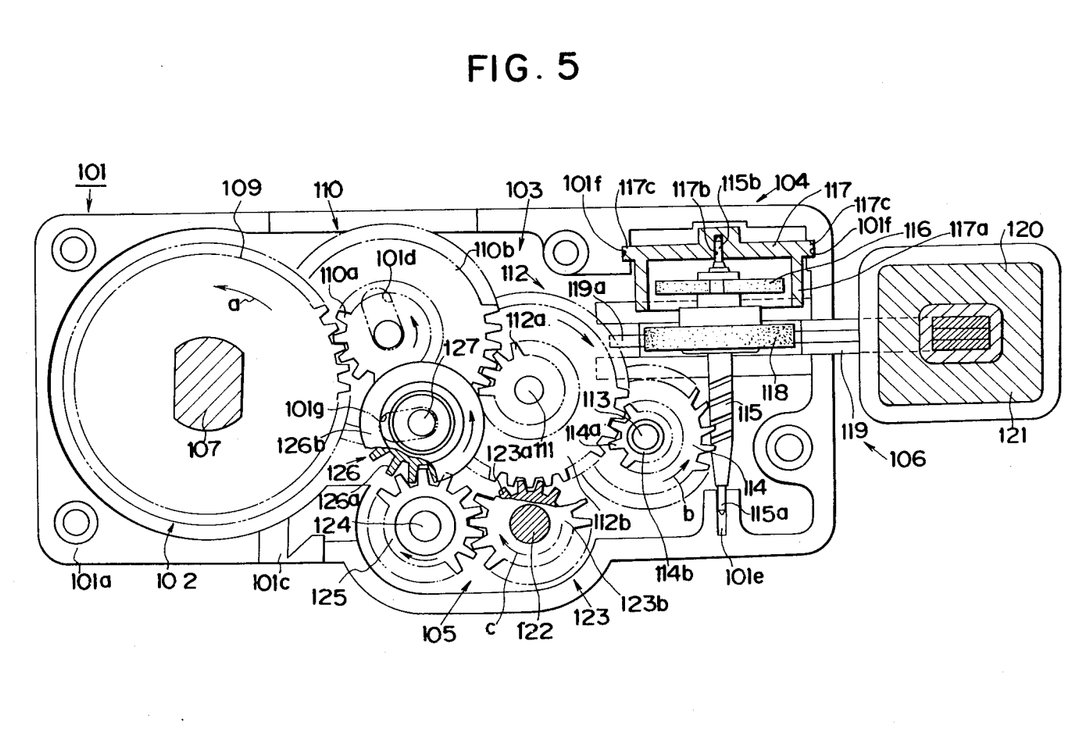
FIG. 5 is a side elevation of a spiral sprig driving device having an electricity generating function, taken as a further embodiment of the invention.
Figure 6:
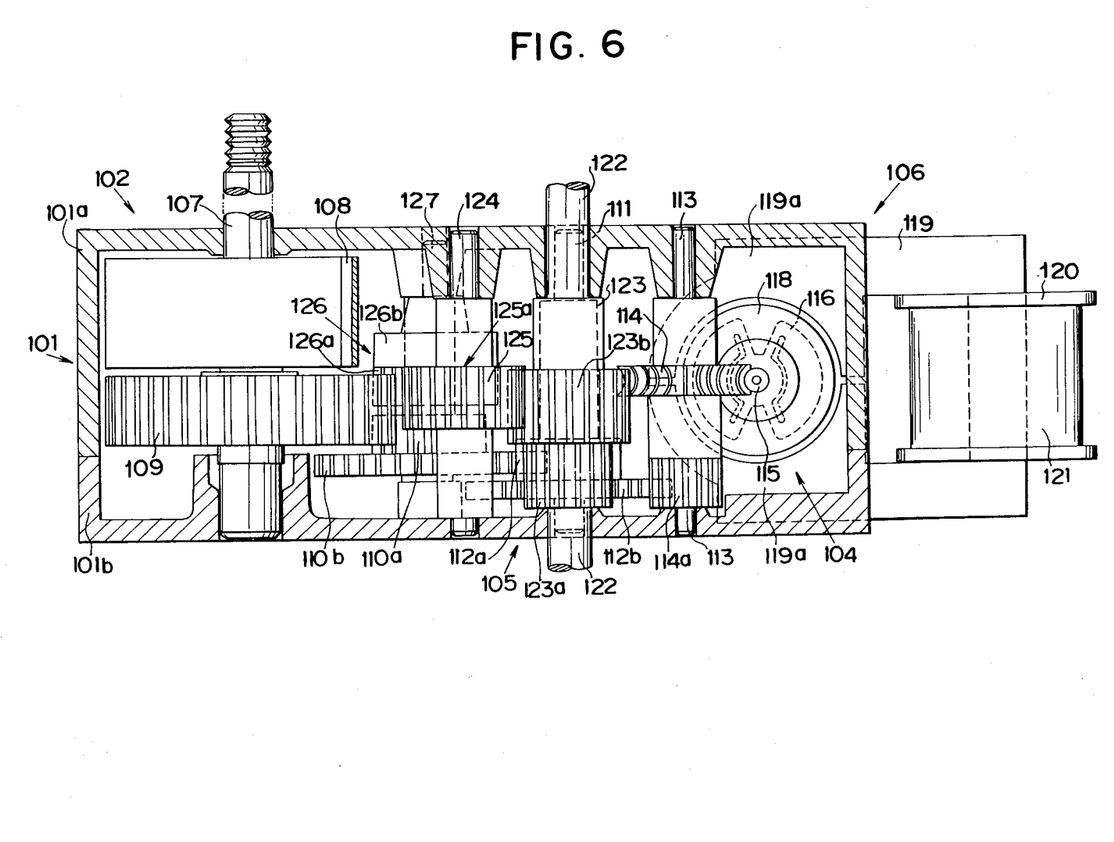
FIG. 6 is a horizontal cross-sectional view of the device of FIG. 5.

Referring to FIGS. 5 and 6, a miniature generator comprises a case 101, a driving assembly 102 mounted in the case 101, a speed up gear assembly 103, a speed adjusting assembly 104, an output assembly 105 and an electricity generating assembly 106 partly exposed outside the case 101. The case 101 consists of a case shell 101a and a cover member 101b which are united after the aforegoing assemblies are mounted therein.

The driving assembly 102 includes a spiral spring shaft 107 pivotably supported on the case 101, a spiral spring 108 having one end fixed to the spiral spring shaft 107 and the other end fixed to a spiral spring fixing member 101c of the case 101. One end of the spiral spring shaft 107 is exposed outside the case 101 and engages a spiral spring winding key (not shown) in a screw driving fashion.

The speed up gear assembly 103 includes two-step gears 110 and 112, a worm wheel 114 and a worm 115. The two-step gear 110 includes a small diameter teeth array 110a and a large diameter teeth array 110b an is movable within the extent of an arcuate elongated hole 101d formed in the case 101 concentrically with the spiral spring shaft 107. The small diameter teeth array 110a always engages a gear 109. The two-step gear 112 is rotatably supported by a shaft 111 on the case 101 and includes a small diameter teeth array 112a and a large diameter teeth array 112b. The small diameter teeth array 112a engages the large diameter teeth array 110b of the former two-step gear 110. The worm wheel 114 is rotatably supported on the case 101 by a shaft 113 and includes a teeth array 114a engaging the large diameter teeth array 112b of the two-step gear 112. The worm 115 is disposed in a crossing relationship with the shaft 113 and engages the worm wheel 114. Between the worm wheel 114 and its teeth array 114a provided a spring clutch 114b configured so that rotation of the teeth array 114a rotated in a direction indicated by arrow b during energy discharge of the spiral spring is transmitted to the worm wheel 114 whereas rotation of the teeth array 114a rotated in the opposite direction during power storage in the spiral spring by winding it by an output shaft 122 is not transmitted to the worm wheel 114.

The gear 109, when rotated in the arrow a direction as the spiral spring is wound up, moves the two-step gear 110 in the same direction along the elongated hole 101d so as to disengage the large diameter teeth array 110*b* from the small diameter teeth array 112*a* of the two-step gear 112. When the gear 109 is rotated in the opposite direction upon power discharge of the spiral spring 108, the two-step gear 110 is moved to the illustrated position where it engages the two-step gear 112. That is, the two-step gear 110 and the elongated hole 101*d* form a clutch mechanism.

The worm 115 at the last stage of the speed up gear assembly 103 has one shaft end 115*a* engaging a support groove 101*e* of the case shell 101*a* and forms a component of the speed adjusting assembly 104 and of the electricity generating assembly 106. The support groove 101*e* rotatably supports the worm 115 when closed by the cover member 101*b*.

The speed adjusting assembly 104 comprises a friction plate 116, a circumferential wall 117*a* and a bearing shell 117. The friction plate 116 is made from rubber or other resilient material and closely forcibly mounted on the shaft of the worm 115. The circumferential wall 117*a* encircles the friction plate 116. The bearing shell 117 includes a bearing hole 117*b* supporting the other end of the worm 115. The bearing shell 117 also includes flanges 117*c*—117*c* engaging grooves 101*f*—101*f* of the case 101. It should be noted that the speed adjusting mechanism for the spiral spring also includes the aforementioned speed up gear assembly 103. However, it was described above separately only for convenience.

When a rotation is transmitted from the worm wheel 114 to the worm 115, the shaft end 115*a* of the worm 115 receives a force which urges it down the bearing hole 117*b*. Therefore, the bearing hole 117*b* is made from a hardwearing plastic or other hardwearing material which resists against a high revolution and a high load, and is fixed to the case 101, as it is in the first embodiment.

Figure 7:
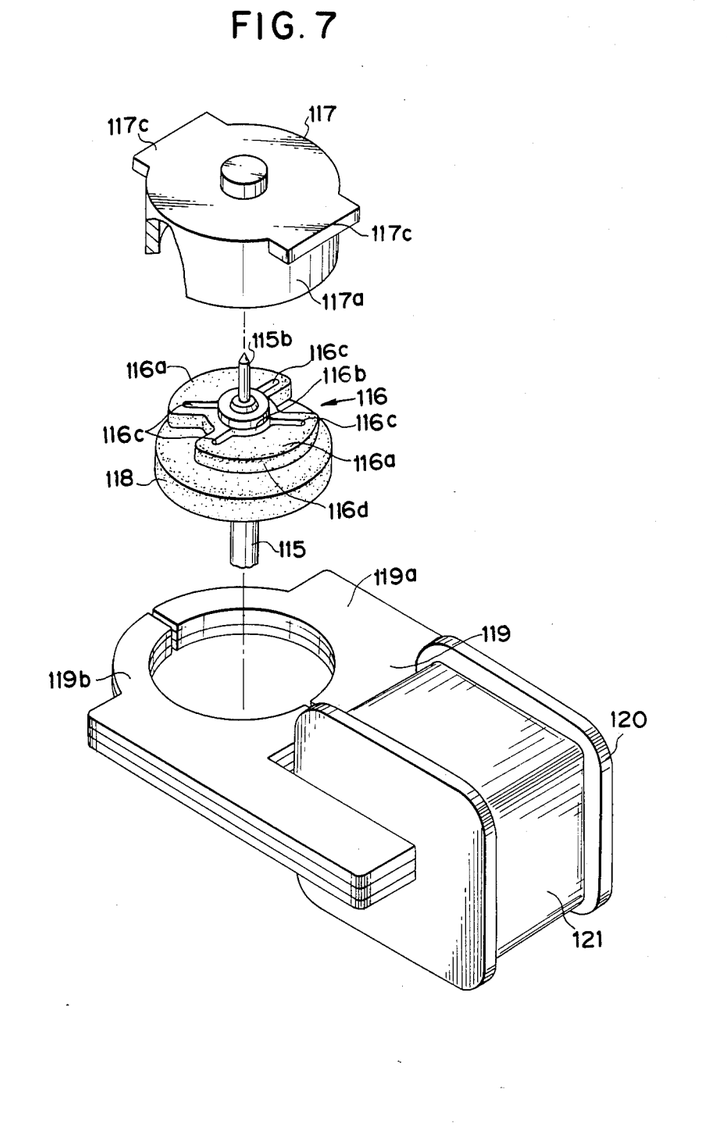
FIG. 7 is a fragmentary exploded perspective view of the device of FIG. 5 which shows the relationship among worm, magnet, friction plate, circumferential walls, yokes and coil.

The friction plate 116, as shown in FIG. 7, includes a pair of sectorial portions 116*a* —116*a*, and its central portion forcibly engages the worm shaft. Each sectorial portion 116*a* has an arcuate slit 116*b* coaxial with the center of the center shaft of the worm and two slits 116*c*—116*c* radially extending from the opposite ends of the arcuate slit 116*b*. When the friction plate 116 rotates at a high speed, the sectorial portions 116*a*—116*a* expand radially outwardly due to a centrifugal force, and their circumferential surfaces 116*d*—116*d* frictionally contact the circumferential wall 117*a* to control the rotation of the worm 115.

The electricity generating assembly 106 comprises a magnet 118 closely mounted on the shaft of the worm 115, yokes 119 inserted in the case 101 and having portions 119*a* encircling the magnet 118, and a coil 121 wound on a bobbin 120 engaging the yokes 119. The coil 121 is connected to an electric circuit not shown. When the magnet 118 is rotated, an alternating voltage is produced in the coil 121. This voltage may be used in the alternating form to light an LED, for example. Obviously, it may be rectified for use as a d.c. voltage source.

The output assembly 105 comprises an output shaft 122 rotatably passes through the case 101, a gear wheel 123 closely engaging the shaft 122, an idle gear 125 rotatably supported on the case 101 by a shaft 124, and a flange gear 126. The gear wheel 123 includes a small diameter teeth array 123*a* engaging the large diameter teeth array 112*b* of the two-step gear 112 and a large diameter teeth array 123*b* engaging the idle gear 125. The flange gear 126 includes a teeth array 126*a* always engaging the idle gear 125 and a flange portion 126*b*.

The output shaft 122 has one end (not shown) on which a movable assembly of a toy is mounted. When the driving device is used in a toy automobile, driving wheels are fixed to opposite ends of the output shaft 122. The output shaft 122 need not be exposed outside the case 101 at both ends thereof, but may be configured to extend beyond the case at only one end thereof, depending on a toy in which the driving device is used. The flange gear 126 has an integral shaft portion 127 extending from one end surface thereof and movably engaging an elongated hole 101*g* of the case shell 101*a*. The flange portion 126*b* confronts with an end surface 125*a* of the idle gear 125 to limit the axial movement of the flange gear 126. The elongated hole 101*g* has an arcuate configuration concentrical with the shaft 124. As will be described in detail later, the flange gear 126 is configured to be isolated from the gear 109 as shown in FIG. 5 while the spiral spring is wound up by rotating the spiral spring shaft 107, but to engage the gear 109 while the spiral spring is wound up by rotating the output shaft 122.

With this arrangement, the miniature generator according to the second embodiment of the invention operates as follows when it is used in a toy automobile. Assume here accordingly that driving wheels are fixed to opposite ends of the output shaft 122, and that the coil 121 in the electricity generating assembly 106 is connected to a lamp lighting LED.

When the spiral spring shaft 107 is rotated in the arrow a direction via a winding key (not shown) fitted thereon, the spiral spring 108 is contracted and stores an energy. Concurrently, the flange gear 126 moves away from the gear 109 along the elongated hole 101*g*. Additionally, the two-step gear 110 engaging the gear 109 is moved in the arrow a direction away from the two-step gear 112 in response to the gear 109. More specifically, when the spiral spring 108 is wound up via the spiral spring shaft 107, a kind of clutch mechanism is activated to hold the driving assembly 102 apart from the speed up gear assembly 103 and from the output assembly 105.

When the spiral spring 108 is fully wound up, and the spiral spring shaft 107 is released, the gear 109 is rotated in a direction opposite to the arrow a direction by the discharged energy of the released spiral spring 108. With the rotation of the gear 109, the two-step gear 110 engaging therewith is moved in the same direction, and its large diameter teeth array 110*b* engages the small diameter teeth array 112*a* of the two-step gear 112 to rotate it in the arrow-indicated direction. The two-step gear 112 rotates the worm wheel 114 via the teeth array 114*a* and rotates the worm 115 at a high speed. Responsively, the magnet 118 unitary with the worm 115 is rotated, and a voltage is produced at the coil 121. The generated voltage lights a lamp of the toy. On the other hand, the gear 123 engaging the large diameter teeth array 112*b* of the two-step gear 112 in the speed up gear assembly 103 rotates the output shaft 122 in a car running direction opposite the direction c shown by a dotted arrow. The car toy containing the driving device therein runs responsively, lighting its lamps.

Rotation of the gear 109 upon release of the spiral spring 108 is speeded up by the speed up gear assembly 103 and rotates the worm 115 at a high speed. When the rotation of the worm 115 at a high speed. When the rotation of the worm 115 exceeds a predetermined value, the sectorial portions 116*a* of the friction plate 116 expand outwardly due to a centrifugal force, and their circumferential margins frictionally contact the inner surface of the circumferential wall 17a to brake the worm 115. When the rotation of the worm 115 decreases below a predetermined value, the sectorial portions 16a resiliently return to their original positions and remove their braking force. The braking operation of the friction plates 16 is intermittently continued until the spiral spring 108 completely loses its power storage, to as to maintain the revolutions of the worm 115 and the output shaft 122 within a predetermined range. The worm 115 also receives a braking force caused by the electricity generating function of the magnet 118 which rotates in the yokes. Therefore, a more stable rotation speed is established. Accordingly, the electricity generating assembly 106 does not generate a high voltage and does not fail to produce a substantially uniform voltage. Further, since the output shaft 122 is rotated at a substantially uniform speed, the car toy runs at a substantially constant speed.

When the output shaft 122 is rotated in the direction opposite the dotted arrow direction c by gear 112, the idler gear 125 engaging the gear 123 is rotated in the arrow direction to rotate the flange gear 126 in the arrow direction. In this case, the gear 126 is located apart from the gear 109 by the elongated hole 101g.

When the output shaft 122 is used to wind up the spiral spring 108, the system operates as follows.

When the wheels of the car toy are rotated directly by the floor or hands in a direction opposite to the running direction, the output shaft 122 is forcibly rotated in arrow c direction. Due to this, the idle gear 125 engaging the large diameter teeth array 123b of the output shaft 122 is rotated in the counter-arrow direction to move the flange gear 126 in the rotating direction of the gear 125 into engagement with the gear 109 to rotate it in arrow a direction. The gear 109 winds up the spiral spring 108 via the spiral spring shaft 107. When the output shaft 122 is rotated, the two-step gear 112 engaging the small diameter teeth array 123a is also rotated. Rotation of the two-step gear 112 causes the other two-step gear 110 to rotate together with the teeth array 114a. The two-step gear 110 in a releasable engagement is disengaged from the small diameter teeth array 112a in response to rotation of the gear 109. The teeth array 114a is rotated in the opposite direction with respect to arrow b, but the rotation is not transmitted to the worm wheel 114 due to a function of the spring clutch 114b. That is, in the illustrated embodiment, when the spiral spring 108 is wound up by the output shaft 122, the speed adjusting assembly 104 is detached from the spiral spring winding system to alleviate the winding force.

If the two-step gear 110 is alternatively mounted at a fixed position, the spiral spring may be wound up through a course of output shaft 122, two-step gear 122, two-step gear 110 and gear 109. In this case, the idler gear 125 and the flange gear 126 may be omitted.

After the spiral spring 108 is wound up, the system operates in the same fashion as described before.

In the above-described embodiments, the current produced by the electricity generating assembly 106 is used to light lamps. However, if a rectifier and a control circuit of an electronic sound generator, for example, are connected, the current may be used to produce music or voice while the car toy runs. Further, the lamps may be flickered. The yokes 119 and the coil 121 are illustrated as projecting outside the case 101. However, they may be fully hidden in the case.

As described, according to the second embodiment of the invention, the use of the friction plates in cooperation with the circumferential wall to adjust the power discharge speed of the spiral spring ensures a stable rotation of the magnet in the electricity generating assembly. In other words, fluctuation of the rotation speed of the magnet is decreased, and the generated voltage is stabilized. The speed adjusting assembly consisting of the friction plates and the circumferential wall is configured to particularly suppress a high range revolution among rotation ranges of the worm. Therefore, the generated voltage is not elevated too much so that low voltage electronic parts may be used. The speed adjusting arrangement using the friction plates and the circumferential wall provides a large braking power as compared to an air braking system. Therefore, the speed up ratio may be decreased, and the gear module may be increased. This facilitates scale reduction of the gears as well as use of plastic resin for manufacturing the gears. As a result, it is possible to provide a lightweight small-scaled miniature generator in the form of a unit suitable for use in a toy.

What is claimed is:

1. A miniature generator comprising:
   a rotary shaft having a worm and rotated by a driving source at a speed increased by said worm;
   a permanent magnet rotor fixed on said rotary shaft;
   a yoke assembly encircling said permanent magnet rotor;
   a coil wound on said yoke assembly;
   a bearing shell including a bearing rotatably supporting one end of said rotary shaft, said bearing preventing axial movement of said shaft in response to an axial urging force exerted on said shaft by said driving source as said driving source is effecting rotation of said worm;
   speed adjusting means provided within said bearing shell for adjusting a speed of said rotary shaft; and
   a case supporting said bearing shell and having therein said worm, said magnet, and at least part of said yoke assembly.

2. A miniature generator of claim 1, wherein said permanent magnet rotor is fixed to said rotary shaft adjacent said one end of said rotary shaft.

3. A miniature generator of claim 1, wherein said bearing shell includes yoke supporting means for positionally fixing said yoke assembly.

4. A miniture generator of claim 1, wherein said speed adjusting means includes a centrifugally expandable friction plate mounted on said rotary shaft, and wherein said bearing shell includes a circumferential wall which encircles said friction plate to frictionally contact same when said friction plate is expanded due to a centrifugal force.

5. A miniature generator of claim 1, wherein a portion of said yoke assembly projects out of said case.

6. A miniature generator comprising:
   a rotary shaft having a worm and rotated by a driving source at a speed increased by said worm;
   a permanent magnet rotor fixed on said rotary shaft;
   a yoke assembly encircling said permanent magnet rotor;
   a coil wound on said yoke assembly;
   a bearing shell including a bearing rotatably supporting one end of said rotary shaft, said bearing preventing axial movement of said shaft in response to an axial urging force exerted on said shaft by said driving source as said driving source is effecting rotation of said worm;

speed adjusting means for adjusting the speed of said rotary shaft, a spiral spring;

a speed-up gear assembly which is operatively coupled between said spiral spring and said worm, which includes a worm wheel engaged with said worm, which includes a movable member, and which includes clutch means provided between said worm wheel and said movable member for operatively coupling said movable member and said worm wheel when said movable member moves in a first direction so that said worm wheel is rotated in response to movement of said movable member in said first direction, and for interrupting said coupling of said movable member and said worm wheel when said movable member is moved in a second direction opposite said first direction as said spiral spring is wound; and a case having therein said spiral spring, said speed-up gear assembly and said clutch means thereof, said worm, at least part of said yoke assembly, and said bearing shell.

7. A device comprising: a yoke assembly; a rotor and means supporting said rotor for rotation about an axis, said rotor being adjacent a portion of said yoke assembly; and speed control means for preventing said rotor from exceeding a predetermined rotational speed, including a member coupled to said rotor and rotatable about said axis synchronously with said rotor, said member being supported for movement radially of said axis between a first position and a second position radially outward of said first position, including resilient means yieldably urging said member toward said axis, said member moving radially outwardly from said first position to said second position against the urging of said resilient means in response to centrifugal force when said rotor exceeds said predetermined rotational speed, and including a stationary surface spaced from and facing said axis, said member being frictionally engagable with said stationary surface when in said second position and being radially spaced from said stationery surface when in said first positon, frictional engaement of said member and said stationery surface producing a braking effect on said member and said rotor.

8. A device of claim 7, including a roatatable shaft which is coaxial with said axis and has said rotor fixedly secured thereon, and including a platelike element which is made of a resilient material and is fixedly secured to said shaft, said platelike element having a portion which is said radially movable member and which moves radially outwardly in response to centrifugal force through flexing of said platelike element, said resilient means being the inherent resilience of said platelike element.

9. A device of claim 8, wherein said portion of said platelike element is sector-shaped, said platelike element including a radial slit which extends radially outwardly into said portion adjacent one angular end of said portion, and including an arcuate slit which extends from the radially inner end of said radial slit toward an opposite angular end of said portion substantially concentric to said axis.

10. A device of claim 9, including a further radial slit which extends radially outwardly into said portion near said opposite angular end thereof, said arcuate slit extending between the radially inner ends of said first-mentioned and further radial slits.

11. A device of claim 8, wherein said plate element has two said portions which are located on diametrically opposite sides of said shaft, and wherein said stationary surface is a radially inwardly facing cylindrical surface which is concentric to said shaft.

12. A device of claim 8, including a worm on said shaft and means cooperable with said worm for effecting rotation of said shaft, wherein said rotor is a permanent magnet, including a bearing shell which rotatably supports one end of said shaft and has means for preventing axial movement of said shaft in response to axial forces exerted on said shaft, said bearing shell having thereon said stationery surface, and including a case which supports said bearing shell.

* * * * *